(12) United States Patent
Frank

(10) Patent No.: US 7,159,830 B2
(45) Date of Patent: Jan. 9, 2007

(54) GRIP TIP

(76) Inventor: Karl Frederick Frank, deceased, late of Fort Myers, FL (US); by Karl Dennison Frank, legal representative, 15 Haskell St., Gloucester, MA (US) 01930

( * ) Notice: Subject to any disclaimer, the term of this patent is extended or adjusted under 35 U.S.C. 154(b) by 231 days.

(21) Appl. No.: 10/792,058

(22) Filed: Mar. 3, 2004

(65) Prior Publication Data

US 2004/0173715 A1    Sep. 9, 2004

Related U.S. Application Data

(60) Provisional application No. 60/451,567, filed on Mar. 3, 2003.

(51) Int. Cl.
F16M 11/20    (2006.01)

(52) U.S. Cl. .................. 248/188.9; 248/155; 156/293; 135/70

(58) Field of Classification Search ............ 248/188.8, 248/188.9, 188.91; 156/293, 294, 196, 160, 156/267
See application file for complete search history.

(56) References Cited

U.S. PATENT DOCUMENTS

| | | | | |
|---|---|---|---|---|
| 755,713 A | * | 3/1904 | Shanahan | .................. 182/110 |
| 3,467,117 A | * | 9/1969 | Lucibello | ..................... 135/77 |
| 3,491,186 A | * | 1/1970 | Rainar | ......................... 264/295 |
| 4,029,174 A | * | 6/1977 | Planck et al. | ............... 182/204 |
| 4,510,957 A | * | 4/1985 | Frank | .......................... 135/84 |
| 4,881,564 A | | 11/1989 | Fetterman | |
| 5,004,635 A | * | 4/1991 | Griebling | ..................... 428/33 |
| 5,153,052 A | * | 10/1992 | Tanaka et al. | .............. 428/212 |
| 5,178,176 A | | 1/1993 | Fetterman | |
| 5,232,908 A | * | 8/1993 | Shiga et al. | ................ 505/433 |
| 5,301,704 A | | 4/1994 | Brown | |
| 5,711,335 A | * | 1/1998 | Carpinella | ................... 135/77 |
| 5,826,606 A | | 10/1998 | Davenport | |
| 5,829,463 A | | 11/1998 | Galan | |
| 5,992,434 A | | 11/1999 | Berlin et al. | |
| 6,003,533 A | | 12/1999 | Midcap | |
| 6,623,082 B1 | * | 9/2003 | Huang | ..................... 297/463.1 |
| 6,802,482 B1 | * | 10/2004 | Harris | ..................... 248/188.9 |

* cited by examiner

Primary Examiner—Kimberly Wood
Assistant Examiner—Steven M. Marsh
(74) Attorney, Agent, or Firm—Beck & Tysver, P.L.L.C.

(57) ABSTRACT

A spiral-wound tip is presented for use on a walking assistance device, a robotic arm or digit, or other device needing a slip-resistant point of contact with its environment. The tip is constructed by winding a sheet of rubber or other elastic material into a spiral plug. The plug can be mounted within a hole at the extremity of a device. Alternatively, the sheet can be wrapped around the exterior of the extremity. The lamina of the spiral-wound plug separate upon impact with an object, increasing the gripping power of the tip.

15 Claims, 5 Drawing Sheets

GRIP TIP

CLAIM OF PRIORITY

This application claims priority to provisional patent application U.S. Ser. No. 60/451,567, filed on Mar. 3, 2003.

FIELD OF THE INVENTION

This invention relates to the field of tips for use with a robotic leg, a gripper, or digit, or for use with walking aids, such as canes and crutches. More particularly, the present invention relates to a tip that provides better grip when engaged with a surface by having a spiral-wound plug.

BACKGROUND OF THE INVENTION

It is well known in the prior art to provide canes, crutches, and other walking aids with a tip made from natural rubber, polyurethane, or similar material. This tip engages with the walking surface, and ideally helps absorbs impact and provides greater gripping than that which would be provided if the walking device directly engaged with the walking surface.

Typical prior art tips incorporate a tread design on the tip's bottom surface to assist in both of these functions. One well-known tread design utilizes concentric ridges protruding from the bottom surface of the tip. Alternative prior art designs include parallel linear ridges, spikes for gripping icy surfaces, and protrusions shaped like pie pieces. Unfortunately, none of the tread designs found in prior art tips provides adequate gripping power on wet or otherwise slippery surfaces.

Similarly, in the field of robotics it is often necessary to increase the gripping power of a tip. For instance, robots that propel themselves by moving two or more legs need to minimize the slippage that occurs as each leg contacts the walking surface. Automated "arms" or "hands" or "fingers" that grasp, push or pull an object also need an ability to grip an object or surface. In these circumstances, it is vital to maximize the amount of friction obtained by the robotic device against surfaces. Unfortunately, prior art techniques of placing a rubber cap on the leg or finger often entails significant effort and expense, and fails to achieve satisfactory results.

What is needed is a way to maximize the gripping power of such tips while minimizing the cost and difficulty of tip construction.

SUMMARY OF THE INVENTION

The present invention overcomes the limitations in the prior art by providing a tip that is easily constructed and provides improved gripping performance on slippery surfaces. This is accomplished by tightly winding a sheet of material into a spiral-wound "plug." This plug can then be attached to a device such as a walking aid, robotic arm, and the like. Preferably, the plug is made from a sheet of rubber or rubber-like material, having a length that is greater than its width, and a width that is at least ten times greater than its thickness.

The attachment can be made by inserting the plug into a receiving hole at the terminal end of the device. Ideally, a friction fit is obtained by which the plug is fixed to the device without the aid of an adhesive or a mechanical fastener. Although such a friction fit is preferred, the present invention remains functional if the plug is otherwise attached to the end of the device.

A second embodiment is also discussed in which the material is wound directly around the end of the device. In this way, the spiral-wound plug is on the exterior of the robotic appendage or walking aid, with such device serving as the core of the plug. This plug can be secured to the device using an adhesive, which also serves to keep the plug in a tightly wound spiral. Alternatively, a band can be used to secure the plug to the device.

In both embodiments, the plug creates layers or lamina that interact with a surface in a unique manner. Upon contact with a surface, the lamina of the spiral-wound plug separate, increasing the gripping power of the tip. The separation of the lamina is controlled by the spiral nature of the plug, thus distinguishing this separation from the separation that might be achieved by a tread design having multiple, separating fingers. The separation of the lamina is especially pronounced when the angle of impact between the device and the surface is less than ninety degrees.

DETAILED DESCRIPTION OF THE INVENTION

Figure 1:
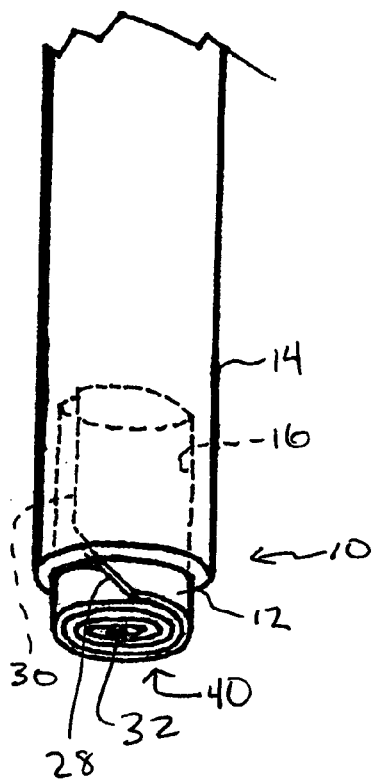
FIG. 1 is a perspective view of a grip or tip of the present invention.

FIG. 1 shows a tip or grip 10 of the present invention. This embodiment of grip 10 is made from a spiral-wound cylinder or plug 12 that is mounted on the extremity of a device 14 that needs to grip a surface. The device 14 may be a prosthetic walking device such as a cane or crutch, or a robotic element such as a limb, digit, gripper, or another robotic component that uses a pad to contact something in its environment. In fact, the device 14 may be any device that has need of a slip-resistant point of contact with its environment (the "environmental point of contact"). As such, grip 10 can serve as a fingertip for manipulating other objects, as a gripper pad for grasping, or as a foot-surface for pedal locomotion.

The device 14 may be made of a variety of materials. Often it is necessary to maximize the load carrying capacity of device 14 while minimizing the weight of device 14. In these circumstances, device 14 is often made of hollow tubing formed from metal, carbon fiber, or glass fiber. In applications where weight is not as significant an issue, the device 14 may be solid wood or metal. In any event, the material of device 14 rarely provides sufficient grip with the environment to function without an attached grip 10.

The grip 10 of the present invention uses a spiral wound plug 12 to engage the environment. This construction results in the creation of layers or lamina that remain separable and exhibit an extraordinary ability to conform to and exert frictional forces against environmental surfaces. Ideal materials from which to construct plug 12 are characterized by 1) a high coefficient of friction in relation to the surfaces on which it will grip; 2) sufficient elasticity to allow the lamina to separate and more readily conform to the environment, and 3) sufficient durability to allow a reasonable service life. Butyl rubber has been commonly used as a tip material for walking aids, and would function well as the material for plug 12. Polyurethane would be another acceptable choice. In fact, any material that has the three properties above similar to or superior to that of rubber would make an acceptable tip 10 for the present invention. In fact, a durability that results in only half the service life of rubber may be acceptable.

The dimensions of the grip 10 vary according to the forces involved in the intended application, just as the dimensions of a tire are relative to the size and weight of the vehicle on which it is mounted. For example, a grip 10 for the foot-pads of a robotic device the size of a man are best made in a diameter greater than an inch, using material for plug 12 similar in composition and thickness to that generally found in an automobile inner tube. A grip 10 for a walking cane is best made in a diameter less than an inch, using material for plug 12 similar to that used in a standard bicycle inner tube.

The plug 12 is inset into a round hole 16 found in the end of device 14. The hole 16 could be the cylindrical space in the end of a piece of tubing, a ferrule attached to an otherwise solid appendage, or a cavity bored out with a drill. Generally, slightly more than half of the length of plug 12 is inserted into the hole with less than half of the plug 12 extended past the end of device 14 to form the gripping surface. The actual amount of the plug 12 that is embedded in the hole depends on the ability to hold the plug 12 in place at the end of device 14 while maintaining the spiral-wound nature of the plug 12. Consequently, if adequate means were available to secure the plug 12, it would be well within the scope of the present invention to insert significantly less than half of the plug 12 within hole 16.

In the preferred embodiment, the plug 12 is fixed within hole 16 through an interference fit. One way to accomplish this is to size the plug 12 and hole 16 appropriately, and then compress the outer diameter of the plug 12 while inserting it into the hole 16. The expansion of the plug 12 within hole 16 then creates the appropriate fit. Assuming the walls that form hole 16 have some elasticity, one might also expand the inner diameter of the hole 16 during the insertion of the plug 12. Either way, the interference fit should securely attach the plug 12 to the end of device 14. Alternative although less preferred methods of attaching plug 12 to device 14 would be clear to one of skill in the art, including through the use of an epoxy or other adhesive, or through a mechanical attachment such as a screw or bolt.

Figure 2:
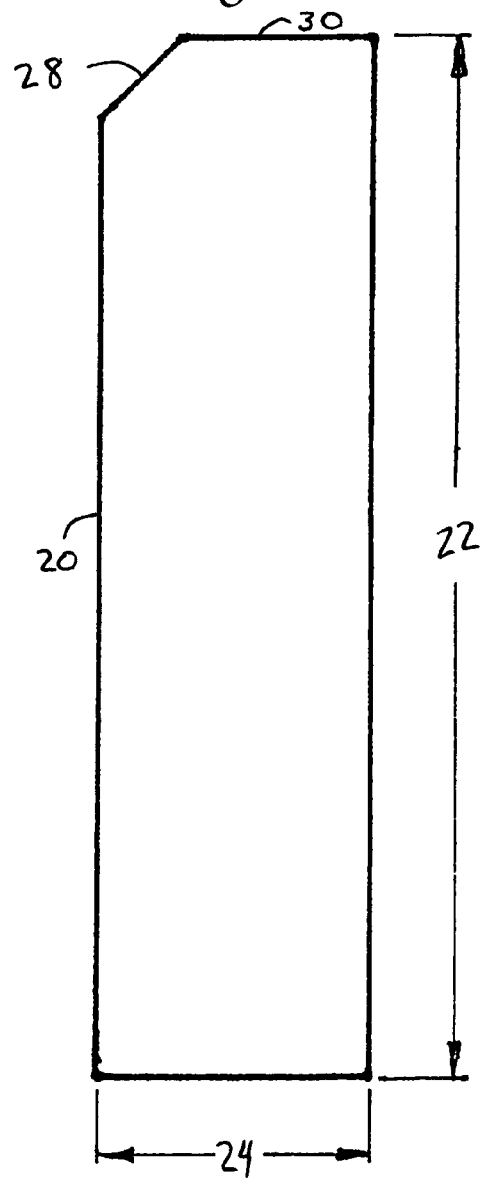
FIG. 2 is a top plan view of a sheet of material used to create the plug for the grip of FIG. 1.
Figure 3:
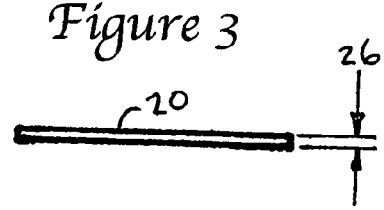
FIG. 3 is a side elevation view of the sheet of FIG. 2.

The spiral-wound laminar plug 12 is made from a generally rectangular piece of rubber-like material 20, such as that shown in FIGS. 2 and 3. The length 22 and width 24 of the rectangular material 20 are as adjusted as needed for the desired size of plug 12 for a given thickness 26 of material 20. For example, a rectangular sheet 20 of butyl rubber that is ³⁄₆₄ths inches in thickness, 1 inch wide and 6 inches long is suitable for making a plug 12 for the foot of a small robotic device or for the tip of a walking cane. A plug 12 for heavy equipment could be made from a sheet a foot wide and a yard long, fashioned from an inch thick carbon-impregnated rubber such as is used in the tread of a truck tire.

For best results, the thickness 26 of sheet 20 is at least an order of magnitude smaller than its width 24, with a length 22 greater that its width 24. These dimensions facilitate the process of rolling it into a spiral cylinder plug 12. Stated otherwise, given that the material has three linear dimensions, length 22, width 24, and thickness 26, the length 22 and the width 24 should each be at least ten times the thickness 26, with the length 22 greater than the width 24.

In the preferred embodiment, one corner of the rectangular sheet 20 is removed at location 28 by cutting off the corner at approximately forty-five degrees. This location 28 will form the exposed outer corner of the plug 12. Clipping the sharp ninety-degree corner off of location 28 helps prevent this corner from flapping loose during use of grip 10. As seen in FIGS. 1 and 2, the amount removed from location 28 is preferably such that, when the plug 12 is inserted in device 14, the remaining portion of side 30 is either wholly within hole 16 or does not significantly extend beyond hole 16.

In the preferred embodiment, sheet 20 is cut from new material of the desired thickness 26 to form a rectangle of the appropriate length 22 and width 24. However, good results can also be obtained by using a segment cut from a tube of rubber-like material, provided the thickness of the tubing wall is an order of magnitude less than the diameter of the tube. All that is necessary is to flatten the tube segment into a rectangle and proceed as if the material came from an originally flat sheet.

Figure 4:
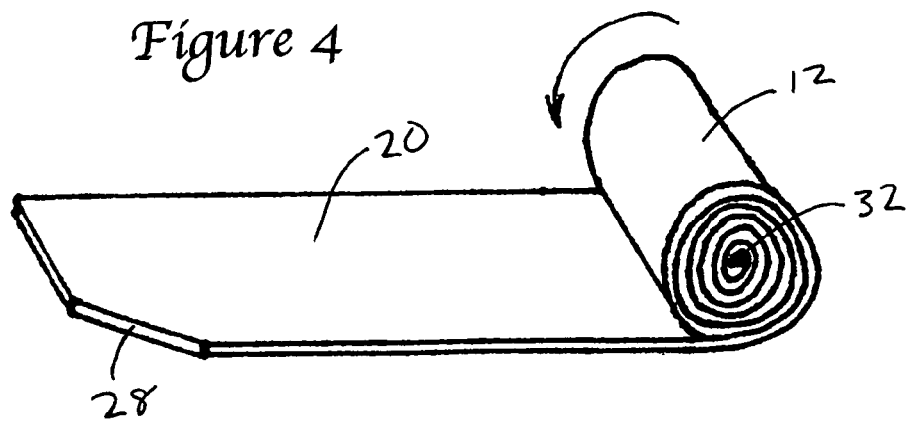
FIG. 4 is a perspective view of the sheet of FIG. 2 being rolled into the plug found in the grip of FIG. 1.

Sheet 20 is rolled to form the spiral plug 12, as is shown in FIG. 4. The diameter of the plug 12 created by the rolling is determined by the thickness of the material from which it is wound, the number of turns, and the size of the core, if any, around which it is wound.

To form a tight spiral, the plug 12 is normally rolled while the sheet 20 is under length-wise tension. This is easily accomplished by laying the rectangle down on a flat surface. One end is fixed or otherwise held down so that tension can be applied to stretch the sheet 20. The other end is then rolled up to form spiral plug 12. The tension applied to sheet 20 can be adjusted as desired during the rolling process. Significant changes to this length-wise tension will cause changes in the width 24 of sheet 20. By selectively changing the width of sheet 20 during the rolling process, one can obtain a convex, concave, or flat surface on the end of the cylinder plug 12.

It is sometimes helpful to use an elongated segment of rubber as a "seed" 32 around which the spiral is formed. Ideally, this segment of rubber tubing is approximately equal in length to the width 24 of the rectangular sheet 20. The rubber seed becomes permanently incorporated into the plug 12 as its core 32.

When the entire length 22 of the rectangle 20 has been wound up into the spiral plug 12, the plug 12 must be bound to allow handling without uncoiling. For best performance, the separate lamina or layers of plug 12 must remain substantially free of each other on at least one side of the plug 12. If adhesives are used to bind the spiral plug 12, care must be taken that adhesive does not bind the portions of plug 12 that will extend beyond hole 16 in device 14. If these portions of the plug 12 layers were bound together, the resultant grip 10 would in effect be similar to a solid cylinder of rubber with a standard tread design. Alternatively, an external wrap of tape or a tight-fitting rubber sleeve can be placed around the spiral plug 12 to enable the plug 12 to be stored and handled until mounting. This wrap can then be trimmed off after the plug is mounted within device 14. The wrap can also function to constrict the diameter of plug 12 for initial insertion into hole 16.

Figure 5:
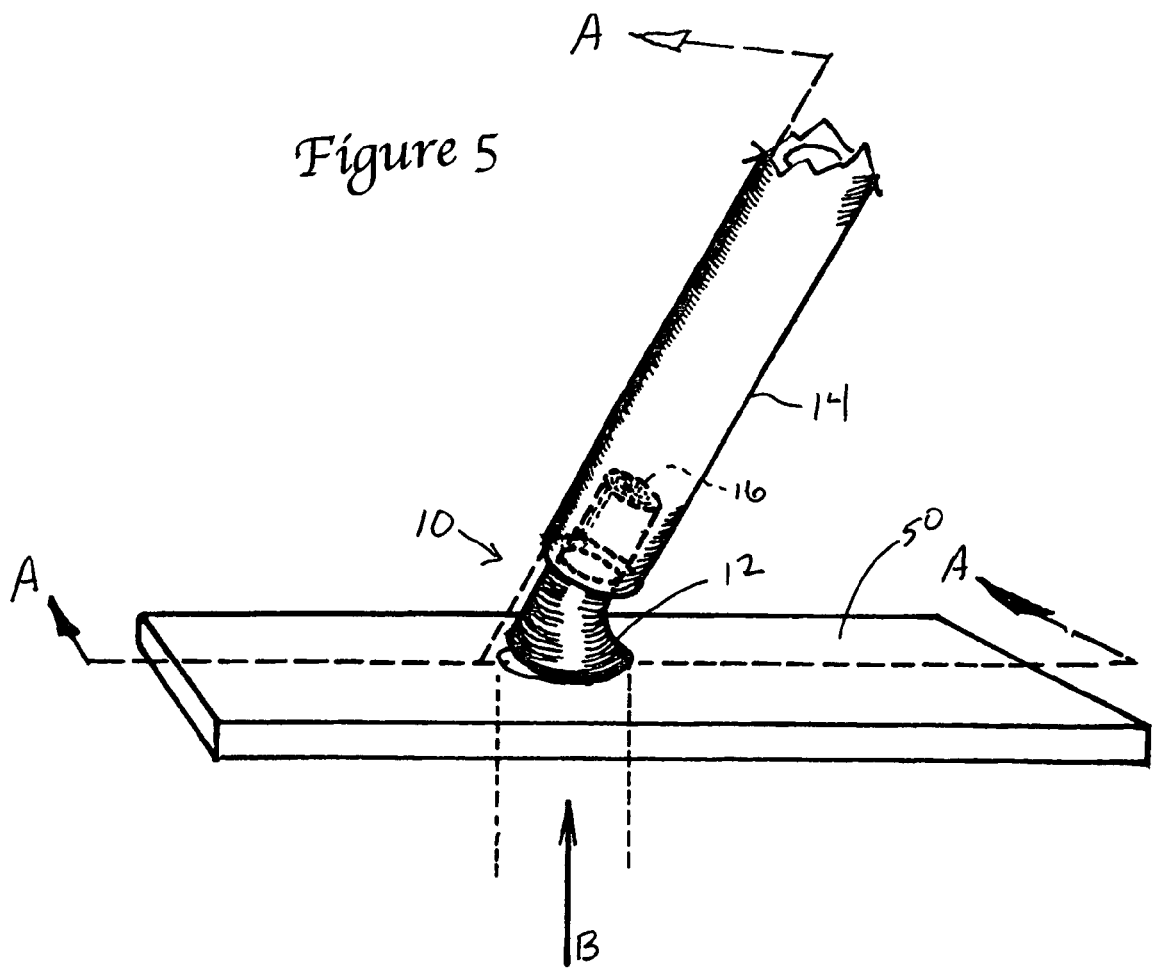
FIG. 5 is a perspective view of the grip of FIG. 1 in use against a surface.
Figure 6:
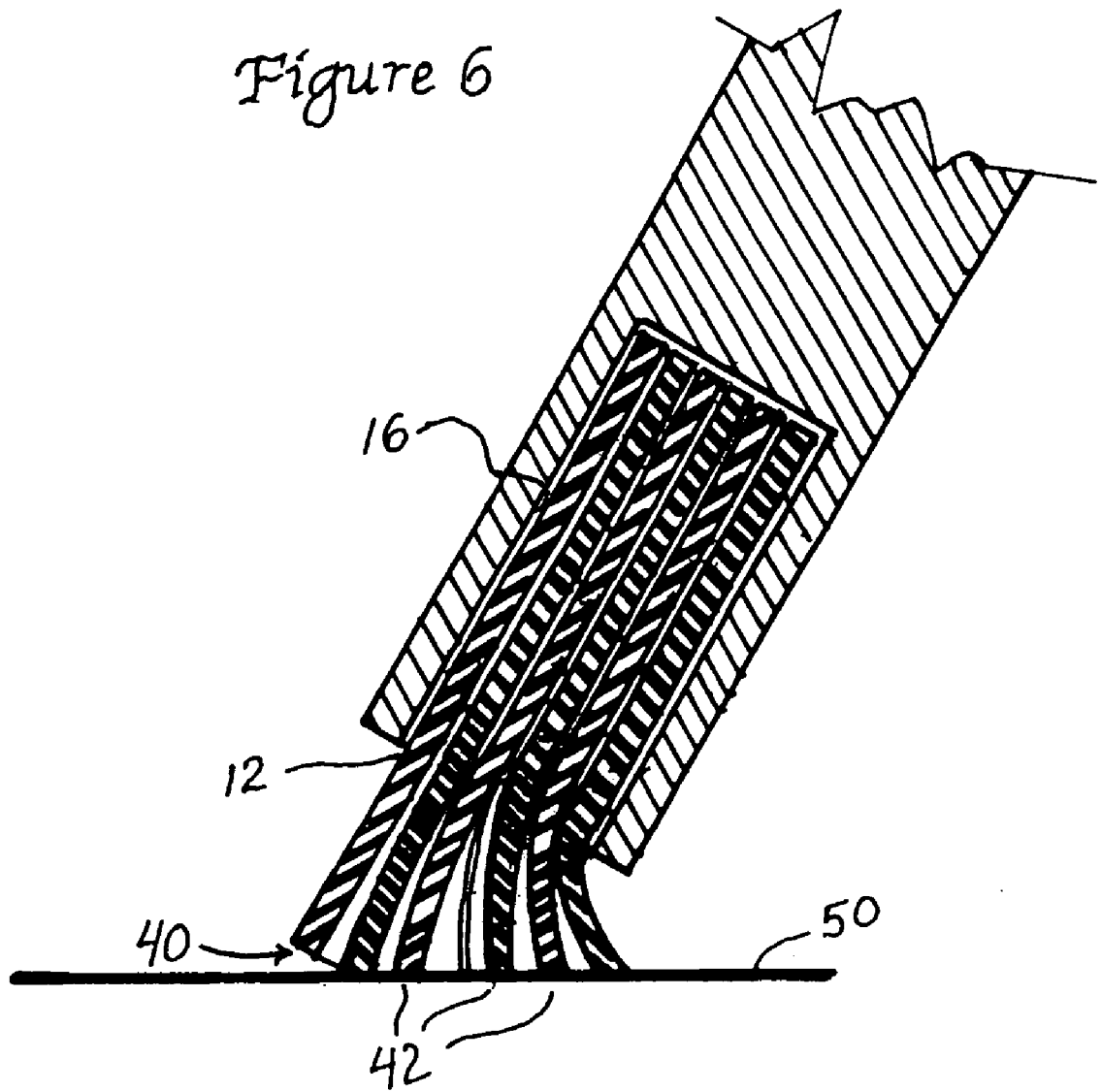
FIG. 6 is a cross-sectional view of the grip of FIG. 5 taken along plane A.
Figure 7:
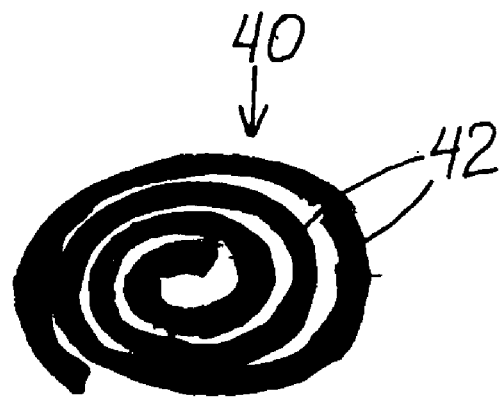
FIG. 7 is a bottom plan view of the contact surface of the grip of FIG. 5, as indicated in FIG. 5 by arrow B.

This manner of construction provides a financial advantage in the manufacturing process versus prior art gripping tips, as a manufacturer can create any size tip 10 quickly and economically, even for short production runs. It is no longer necessary for a manufacturer to create a separate die or mold for each desired tip size, and the equipment to cast or mold rubber-like materials is no longer necessary. All that is necessary is to have on hand sheets 20 of material having the desired thickness 26. The sheets 20 can then be cut to the appropriate length 22 and width 24 as needed The grip 10 of the present invention also provides a significant performance advantage over prior art tips. FIGS. 5 through 7 show a device 14 having grip 10 of the present invention in use with an object 50. The spiral-wound plug 12 of grip 10 provides the ideal contact surface 40 with an object 50. The individual lamina or layers 42 that comprise the plug 12 separate when the surface 40 impacts the object 50, especially when the impact is at an angle less than ninety degrees. Unlike prior art grips where a superficial tread pattern is molded or cut into a solid rubber tip, the lamina 42 of the present invention are able to separate from each other. In addition, as shown most clearly in FIG. 7, the spiral nature of the lamina 42 that comprise surface 40 are unique in that they are linked together. As one lamina 42 moves, they pull upon and distort one another in adaptive ways. For instance, the outermost lamina 42 is able to separate itself only so far from the rest of the plug 12. This is unlike tread designs that contain truly independent fingers or treads.

The movement of the lamina 42 upon contact with object 50 results in many contact edges and surfaces not bound together by the solid substructure of a tread in a prior art tip. This enables the separate lamina to individually move against each other, facilitating the transition to exerting forces according to the static coefficient of friction. Direct comparison between the present invention grip 10 and solid molded rubber caps of similar size suggests that the laminar construction of plug 12 produces effects significantly superior to those achieved with grooves and tread patterns cast, cut, or molded into a rubbery surface.

Another benefit of mounting the spiral-bound plug 12 within hole 16 is that it is possible to trim the contact surface to any depth without removing the tread pattern. As wear occurs, the plug can be extended from hole 16 and retrimmed. It is also possible to alter the contact surface 40 of grip 10 by cutting or otherwise shaping surface 40 after the plug 12 is mounted to the device 14. A straight cut parallel to surface 40 will expose fresh rubber that should increase the gripping ability of the surface 40. Because the separate lamina run through the entire body of the plug, cutting away material from the contact surface has no material impact on the skid-proof nature of the device. Alternatively, the surface 40 could be reshaped into a concave or convex surface. A convex surface 40 would maximize the number of lamina 42 that first impact an object 50 when the grip 10 impacts the object 50 at less than a ninety-degree angle.

Figure 8:
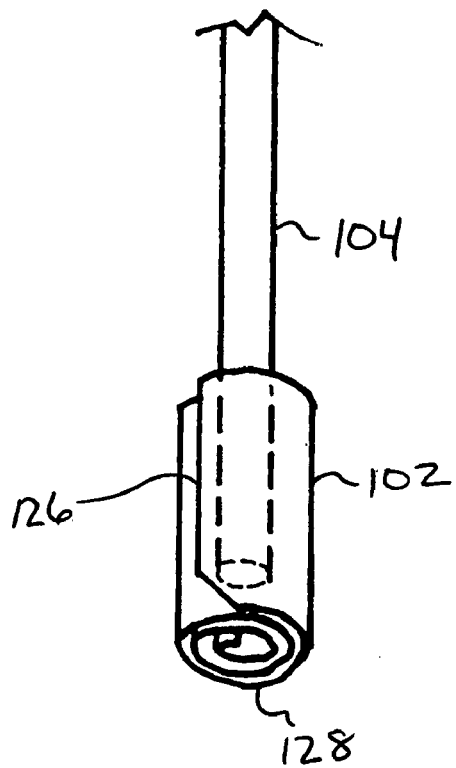
FIG. 8 is a perspective view of an alternative embodiment of a grip or tip of the present invention.

An alternative embodiment 100 of the present invention is shown in FIG. 8. This embodiment 100 is useful where the device 104 needing grip 100 is a long, relatively thin solid. For example, small experimental and toy robots may have legs consisting entirely of solid heavy piano wire. In this case, it is not practical to form a hole in device 104 as was done in FIG. 1. Rather, a spiral wound plug 102 is formed around the circumference of device 104.

Figure 9:
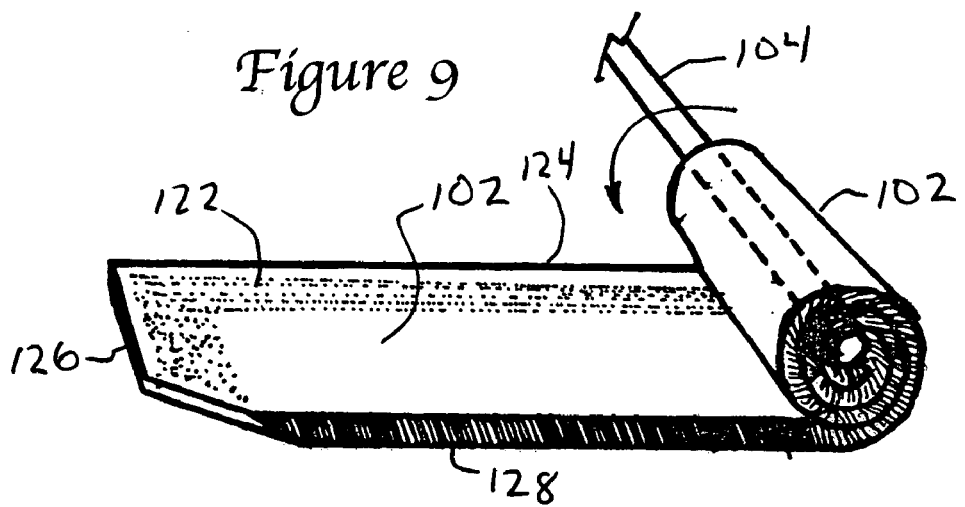
FIG. 9 is a perspective view of a sheet of material being rolled into the plug found in the grip of FIG. 8.

The process for forming plug 102 is shown in FIG. 9. As shown in that figure, the device 104 is used as the core around which a sheet 120 of material is tightly wrapped to form the plug 102. The figure also shows that it is possible that the device 104 extends almost completely through the spiral plug 102. This is not necessary, however, and an effective grip 100 can be created where the device does not extend all the way through the plug 102.

It is necessary to secure the plug 102 to the device 104 to prevent the grip 100 from falling off during use. In the preferred embodiment, this is accomplished by coating the portion of the device 104 that forms the cord of plug 102 with a flexible adhesive 122. One adhesive suitable for this purpose is "Pliobond," a trademark of Ashland Oil, and marketed by W. J. Ruscoe Company (Akron Ohio 44301).

Figure 10:
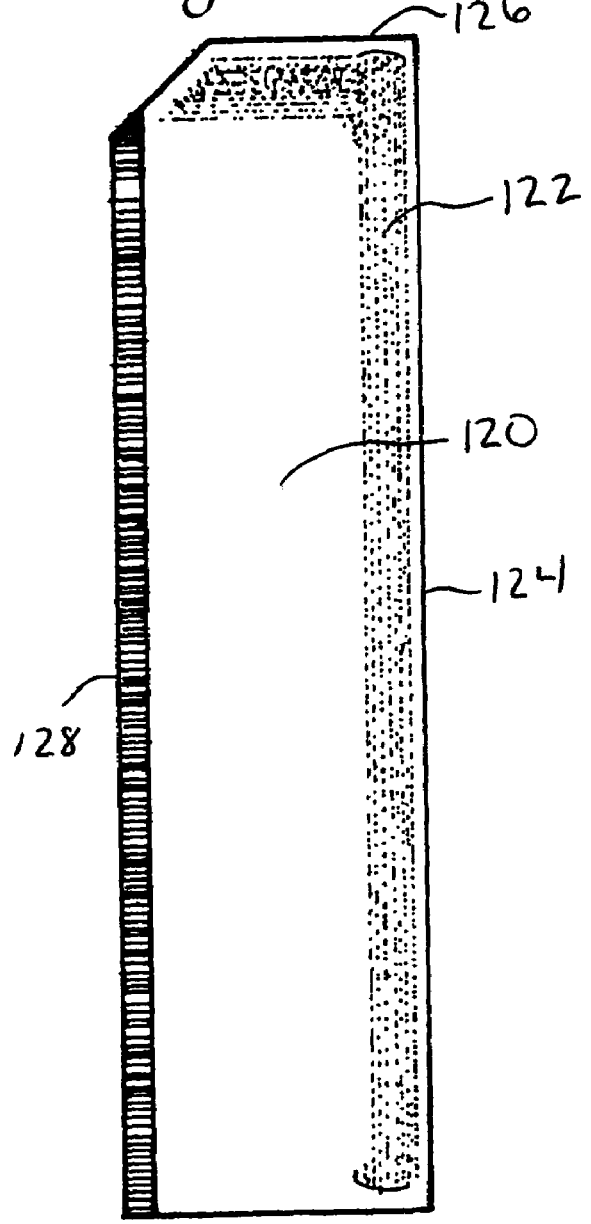
FIG. 10 is a top plan view of the sheet of material shown in FIG. 9.

This same adhesive can be used to prevent the core 102 from unraveling during use by applying a strip of adhesive 122 directly to the sheet 120 prior to rolling. Ideally, the adhesive strip 122 runs along the length of the sheet 120 along side 124 and side 126, as shown in FIG. 10. By limiting the adhesive only to the side 124 of sheet 120 and not the contact side 128, the portion of the core 102 that engages with an object during use is free to separate into the separate layers of the spiral. Meanwhile, the adhesive along side 126 prevents any unraveling of this exposed edge.

Alternatively, the plug 102 could be held on device 104 via an elastic band or tape. Such a band would wrap around the plug 102 near side 124, and could also serve to prevent the unwinding of plug 102.

Figure 11:
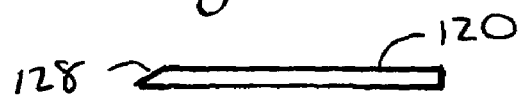
FIG. 11 is a side elevation view of the sheet of FIG. 10.

Grip 100 differs from the first embodiment grip 10 shown in FIGS. 1 though 4 in the existence of an angled edge surface 128 that engages with the environment. As seen in FIGS. 10 and 11, this edge surface 128 is formed by cutting a long side of the rectangular rubber-like material 120 at a dihedral angle (other than ninety degrees) from the surface. This produces a softer edge 128, which is more capable of gripping a wet surface than the edge found in grip 10.

The invention is not to be taken as limited to all of the above details, as modifications and variations may be made without departing from the spirit or scope of the invention. For instance, although the above description generally refers to the device as a walking assistance device or robotic appendage, the present invention could be used on any device that has need of a slip-resistant point of contact with its surroundings. Consequently, the invention should not be limited by the specifics of the above description, but rather should be limited only by the following claims.

What is claimed is:

1. A method for creating a gripping tip comprising:
   a) creating a rectangular sheet of elastic material having a length, a width, and a thickness, with both the length and the width significantly greater than the thickness and with the length being longer than the width;
   b) rolling the sheet along the length to create a spiral plug having a length approximately equal to the width of the sheet; and
   c) affixing the spiral plug to an environmental contact point on a device, wherein the device is selected from the group consisting of a prosthetic walking device and a robotic appendage.

2. The method of claim 1, wherein the width and the length are both at least ten times greater than the thickness.

3. The method of claim 1, further comprising the step of applying tension to the rectangular sheet during the step of rolling the sheet.

4. The method of claim 3, wherein the step of applying tension varies the width of the rectangular sheet.

5. The method of claim 1, further comprising the step of:
   d) making a length-wise cut along the rectangular sheet at an angle other than perpendicular to the surface of the sheet, thereby forming a length-wise angular edge.

6. The method of claim 1, further comprising the step of:
   d) cutting away one corner of the sheet forming a portion without a ninety-degree corner and further wherein the steps of rolling and affixing results in the portion being on the exterior of the spiral plug distal from the environmental contact point of the device.

7. The method of claim 1, wherein the step of affixing the spiral to the environmental contact point of the device further comprises:
   i) forming a hole in the device for receiving the spiral at the environmental contact point of the device; and
   ii) inserting the spiral into the hole.

8. The method of claim 7, wherein the spiral is inserted into the hole such that more than half of the length of the spiral is within the hole.

9. The method of claim 7, wherein the spiral is affixed to the environmental contact point of the device via one of the following set of techniques: a friction fit with the hole, and adhesive, and a mechanical fastener.

10. The method of claim 1, wherein the elastic material is chosen from the set of: rubber and polyurethane.

11. The method of claim 1, wherein the elastic material has a coefficient of friction similar to or greater than rubber, an elasticity similar to or greater than rubber, and a durability creating a service life at least half as long as rubber.

12. The method of claim 1, wherein the environmental contact point of the device is a distal end of the device, and the step of rolling the sheet further comprises rolling the sheet around the distal end of the device.

13. The method of claim 12 wherein the spiral is affixed to the distal end of the device via an adhesive.

14. The method of claim 12, wherein the spiral is affixed to the distal end of the device via a band wrapped around the spiral.

15. The method of claim 12, wherein the distal end of the device extends approximately all the way through the center of the spiral.

* * * * *